United States Patent
Fujimoto et al.

Patent Number: 6,162,847
Date of Patent: *Dec. 19, 2000

[54] PREPARING NBR RUBBER SEAL PRODUCTS WITH PHOSPHITE AND PHOSPHATE ADDITIVES

[75] Inventors: Kenichi Fujimoto; Kenji Mikuni, both of Fujisawa, Japan

[73] Assignee: Freudenberg-NOK General Partnership, Plymouth, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/986,470

[22] Filed: Dec. 8, 1997

[30] Foreign Application Priority Data

Feb. 12, 1997 [JP] Japan ................. 9-041427

[51] Int. Cl.⁷ .............. C08K 5/521; C08K 5/526; C08K 5/527; C08L 9/02
[52] U.S. Cl. ............. 524/120; 524/147; 524/565; 524/571; 525/332.5
[58] Field of Search ................. 524/120, 565, 524/566, 147, 571; 525/332.5

[56] References Cited

U.S. PATENT DOCUMENTS

| | | | |
|---|---|---|---|
| 4,332,918 | 6/1982 | Fukahori et al. | 525/259 |
| 4,994,508 | 2/1991 | Shiraki et al. | 524/14 |
| 5,362,787 | 11/1994 | Ngoc et al. | 524/297 |
| 5,364,899 | 11/1994 | Watanabe et al. | 524/568 |

*Primary Examiner*—David W. Wu
*Assistant Examiner*—K C Egwim

*Attorney, Agent, or Firm*—Dinnin & Dunn PC

[57] ABSTRACT

A method for preparing a rubber seal product of a type which contacts a metal surface for sealing thereof, comprising the steps of: preparing a rubber composition comprising acrylonitrile butadiene rubber (NBR), (A) a carbocyclic phosphite compound represented by the general formula

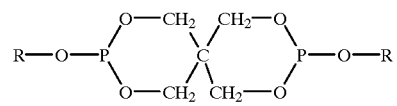

where R is an alkyl group having 8 to 24 carbon atoms, or a phenyl group having a mono-, di- or tri-substituted alkyl group having 1 to 10 carbon atoms, and (B) an acid phosphate compound represented by the general formula

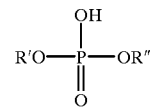

where R' is a hydrogen atom, or an alkyl group having 1 to 13 carbon atoms, and R" is an alkyl group having 1 to 13 carbon atoms, the phosphate compound having an acid number of about 150 to 800 KOH mg/g; wherein a total of about 5 to 20 parts by weight of compound (A) and compound (B) are present in the composition based on 100 parts by weight of NBR, vulcanizing the rubber composition to obtain a vulcanized rubber composition; and compressing the vulcanized rubber composition toward a metal surface.

9 Claims, No Drawings

PREPARING NBR RUBBER SEAL PRODUCTS WITH PHOSPHITE AND PHOSPHATE ADDITIVES

BACKGROUND OF THE INVENTION

1. Field of the Invention

This invention relates to an NBR (acrylonitrile-butadiene rubber) composition, and more particularly, to an NBR composition having a high resistance to adherence to metals.

2. Description of the Prior Art

Sealing members made of rubber, such as O-rings, packings and gaskets, are often used in intimate contact with metal surfaces, such as of shafts and covers, and the adherence of rubber to the metal surfaces creates trouble when the sealing member has to be changed. For example, the rubber adhering to a shaft, or cover makes its removal difficult, or is difficult to remove completely from its surface. A change of parts made under such circumstances results in the formation of an incomplete seal.

A number of methods have been proposed for preventing such adherence of rubber, but none of them has been found satisfactory from the standpoint of effect, productivity, or cost, as stated below:

(1) Blooming or Bleeding:

A lubricant, or plasticizer having low compatibility with rubber is, for example, added to rubber so as to bloom or bleed from the rubber to form a layer for preventing it from contacting a metal surface. This method is, however, not very effective, since the material which has bloomed, or bled out of rubber is likely to flow away, depending on the object to be sealed. Moreover, the rubber is likely to have its physical properties lowered by the addition of the material having low compatibility with it.

(2) Coating:

A molded and vulcanized product of rubber has its surface coated with a film of a solid lubricant, such as graphite or molybdenum disulfide, or of a silicone coating agent. Such a film, however, peels off easily. The coating material is likely to form foreign matter in the object to be sealed. Moreover, its application calls for an additional job and an additional cost of manufacture.

(3) Chemical Surface Treatment:

A molded and vulcanized product of rubber has its surface hardened by treatment with a halogen treating solution containing chlorine or fluorine, or an acid, or alkali to acquire resistance to adherence to a metal surface. The hardened surface of rubber, however, makes it resinous, and likely to crack by deformation, and thereby give an incomplete seal. Moreover, the treatment calls for an additional job and an additional cost of manufacture.

SUMMARY OF THE INVENTION

Under these circumstances, it is an object of this invention to provide an acrylonitrile-butadiene rubber (NBR) composition which has a high resistance to adherence to metal surfaces, and is useful as a material for a molded and vulcanized sealing member.

This object is attained by an NBR composition which comprises:

100 parts by weight of NBR, or rubber consisting mainly of NBR; and a total of about 5 to 20 parts by weight of:

(A) a carbocyclic phosphite compound represented by general formula

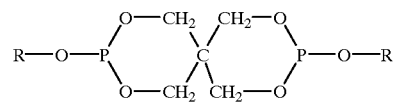

where R is an alkyl group having 8 to 24 carbon atoms, or a phenyl group containing a mono-, di- or tri-substituted alkyl group having 1 to 10 carbon atoms; and (B) an acid phosphate compound represented by general formula

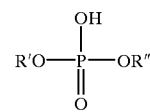

where R' is a hydrogen atom, or an alkyl group having 1 to 13 carbon atoms, and R" is an alkyl group having 1 to 13 carbon atoms, the phosphate compound having an acid value of about 150 to 800 KOH mg/g, the total of the (A) and (B) compounds consisting of about 20 to 90% by weight of (A) and about 10 to 80% by weight of (B).

A molded and vulcanized product of the NBR composition according to this invention can maintain its property of resisting adherence to a metal surface on which it forms a seal against e.g. engine or gear oil, or a transmission, or power steering fluid, and even if it may be exposed to an elevated temperature. The compounds added to NBR form on the surface of the molded product a film which prevents it from adhering to a metal surface and remains effective for a long time, without calling for any extra and costly job, such as coating or chemical treatment, and without lowering the physical properties of the rubber.

The salient features of the NBR composition according to this invention as stated above make it useful not only as a material for sealing members, such as O-rings, D-rings, packings and gaskets, of which the adherence to metal surfaces has hitherto been a serious problem, but also as a material for molded and vulcanized parts of rubber for industrial use, such as packings for oil level gauges, and plug tube seals.

DETAILED DESCRIPTION OF THE INVENTION

The NBR composition of this invention comprises NBR, or rubber consisting mainly of NBR, or a mixture thereof. NBR containing vinyl chloride, or carboxyl groups is an example of rubber consisting mainly of NBR.

The composition further contains (A) a carbocyclic phosphite compound (or compounds) and (B) an acid phosphate compound (or compounds) having the general formulas shown before. Specific examples of the carbocyclic phosphite compounds are cyclic neopentane tetraylbis(octyl phosphite), cyclic neopentane tetraylbis-(dodecyl phosphite), cyclic neopentane tetraylbis(tetradecyl phosphite), cyclic neopentane tetraylbis(nonadecyl phosphite), cyclic neopentane tetraylbis(2,4,6-trimethylphenyl phosphite), cyclic neopentane tetraylbis(4-methyl-2,6-t-butylphenyl phosphite), and cyclic neopentane tetraylbis-(2,4-di-t-butylphenyl phosphite).

Specific examples of the acid phosphate compounds are alkyl acid phosphate compounds consisting mainly of a compound having an alkyl group as R' in the general formula, and containing also a compound having a hydrogen atom as R', while R" is an alkyl group, such as methyl acid phosphate, propyl acid phosphate, butyl acid phosphate, 2-ethylhexyl acid phosphate, isodecyl acid phosphate, tridecyl acid phosphate and monoisodecyl acid phosphate; monoalkyl phosphate compounds having a hydrogen atom as R' and an alkyl group as R", such as monobutyl phosphate; and dialkyl phosphate compounds having alkyl groups as R' and R", such as dibutyl phosphate, di(2-ethylhexyl) phosphate and methyl ethyl phosphate.

It is important for the composition to contain any such acid phosphate compound having an acid value of about 150 to 800 KOH mg/g, and preferably about 200 to 700 KOH mg/g. The use of any compound having an acid value deviating from the specified range makes it impossible to realize any resistance of rubber to adhering to a metal surface as intended by this invention.

The composition of this invention comprises 100 parts by weight of NBR, or rubber consisting mainly of NBR, and a total of about 5 to 20 parts, and preferably about 7 to 17 parts, by weight of carbocyclic phosphite and acid phosphate compounds (A) and (B). The compound (A) occupies about 20 to 90%, and preferably about 40to80%, by weight, and the compound (B) about 10 to 80%, and preferably about 20 to 60%, by weight, in the total amount of (A) and (B). These proportions are selected to ensure the resistance of rubber to adhering to a metal surface. The addition of a total of more than about 20 parts by weight of (A) and (B) not only brings about a great lowering in the physical properties of vulcanized rubber, but also results in the contamination of the mold which is undesirable from the standpoint of productivity.

The composition may further contain ordinary additives for rubber including a reinforcing agent such as carbon black, a filler such as talc or calcium carbonate, an aging inhibitor, a lubricant (or processing assistant), a plasticizer, a pigment, a vulcanizing agent and a vulcanizing accelerator. The composition is prepared by mixing its essential constituents as described above, and any necessary additives in, for example, an open roll mill, Banbury type mixer, or internal mixer. Then, it may be formed into any desired shape, and vulcanized by heating at a temperature of about 150° C. to 200° C. for about 5 to 30 minutes. Secondary vulcanization may be carried out at about 100° C. to 170° C., if required.

The invention will now be described more specifically based on a number of examples embodying it and comparative examples.

EXAMPLE 1

The materials as listed below were mixed by a 1L kneader and a 12-inch open roll mill, and the mixture was subjected to 10 minutes of press vulcanization at 170° C. to form a molded and vulcanized rubber sheet having a thickness of 2 mm:

100 parts by weight of NBR (N241, product of Nippon Synthetic Rubber);
30 parts by weight of N550 carbon black;
40 parts by weight of N990 carbon black;
5 parts by weight of zinc oxide;
1 part by weight of stearic acid;
2 parts by weight of 4,4'-(α,α-dimethylbenzyl)-diphenylamine;
5 parts by weight of dibutoxyethoxyethyl adipate;
0.8 part by weight of sulfur;
2 parts by weight of tetramethylthiuram disulfide;
2 parts by weight of N-cyclohexyl-2-benzothiazyl-sulfenamide;
8 parts by weight of (A) carbocyclic phosphite compound (R: $C_{18}H_{37}$);
3 parts by weight of (B) butyl acid phosphate (AP-4, product
of Daihachi Chemical having an acid value of 450).

Strips measuring 5 mm by 40 mm were punched from the vulcanized rubber sheet as samples for adherence tests. Each adherence test was conducted by compressing each rubber sample by 25% of its thickness between two metal pieces each measuring 25 mm by 60 mm by 1.5 mm and given dry matte treatment to a surface roughness, $R_{max}$, of 2 to 4 microns, dipping them in a testing liquid to leave it at 130° C. for 240 hours, separating the sample from the metal pieces, and inspecting them visually for any adherence of rubber.

The test was repeated five times by employing different materials for the metal pieces, and different oils for the testing liquid, as listed below:

| Test | Metal piece | Oil |
|---|---|---|
| I | SPCC | ATF Matic C |
| II | SUS3O4 | Gear oil (API GL-5) |
| III | Gray cast iron | Engine oil (SG 10W-30) |
| IV | Ductile cast iron | Engine oil (SH 5W-30) |
| V | Nodular cast iron | Engine oil (SJ 5W-20) |

Other samples likewise compressed between metal pieces were not dipped in oil, but were left to stand in the air heated to 110° C. for 240 hours, and their inspection was likewise made.

EXAMPLE 2

An NBR composition was prepared and tested by changing the amount of (A) to 7 parts by weight, employing 7 parts by weight of di(2-ethylhexyl) phosphate (DP-8, product of Daihachi Chemical having an acid value of 220) as (B), and otherwise repeating Example 1.

EXAMPLE 3

An NBR composition was prepared and tested by employing as (A) 6 parts by weight of a carbocyclic phosphite compound having as R

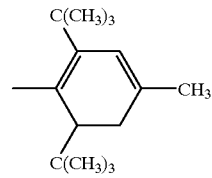

changing the amount of (B) to 4 parts by weight, and otherwise repeating Example 1.

COMPARATIVE EXAMPLE 1

An NBR composition was prepared and tested by employing octadecyl acid phosphate having an acid value of 120 as (B), and otherwise repeating Example 1.

COMPARATIVE EXAMPLE 2

An NBR composition was prepared and tested by employing as (A) a carbocyclic phosphite compound having $C_2H_5$ as R, and otherwise repeating Example 2.

COMPARATIVE EXAMPLE 3

An NBR composition was prepared and tested by employing as (A) a carbocyclic phosphite compound having $C_2H_5$ as R, and as (B) octadecyl acid phosphate having an acid value of 120, and otherwise repeating Example 3.

EXAMPLE 4

The materials as listed below were mixed by a 2L internal mixer and a 12-inch open roll mill, and the mixture was subjected to 8 minutes of press vulcanization at 175° C. to form a molded and vulcanized rubber sheet having a thickness of 2 mm:

100 parts by weight of NBR (Nipol DN300, product of Nippon Zeon);

50 parts by weight of N774 carbon black;

30 parts by weight of calcium carbonate;

5 parts by weight of zinc oxide;

1 part by weight of stearic acid;

1 part by weight of wax (Sannok, product of Ouchi Shinko Chemical);

8 parts by weight of dioctyl sebacate;

2 parts by weight of N-phenyl-N'-isopropyl-p-phenylenediamine;

1 part by weight of sulfur;

1.5 parts by weight of zinc dimethyldithiocarbamate;

2.5 parts by weight of dibenzothiazyl disulfide;

10 parts by weight of (A) carbocyclic phosphite compound (R: $C_{12}H_{26}$);

2 parts by weight of (B) isopropyl acid phosphate (AP-3, product of Daihachi Chemical having an acid value of 450).

Then Example 1 was repeated for preparing samples and conducting adherence tests.

EXAMPLE 5

An NBR composition was prepared and tested by changing the amount of NBR to 50 parts by weight, employing 50 parts by weight of NBR containing vinyl chloride (Nipol DN502, product Nippon Zeon), and employing as (A) 10 parts by weight of carbocyclic phosphite compound having as R

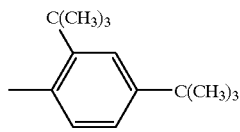

While employing 5 parts by weight of monobutyl phosphate (MP-4, product of Daihachi Chemical having an acid value of 650) as otherwise repeating Example 4.

EXAMPLE 6

An NBR composition was prepared and tested by changing NBR to NBR containing carboxyl groups (Nipol N34, product of Nippon Zeon), employing as (A) 9 parts by weight of the carbocyclic phosphite compound as used in Example 5, and employing 4 parts by weight of isopropyl acid phosphate as (B), and otherwise repeating Example 4.

COMPARATIVE EXAMPLE 4

An NBR composition was prepared and tested by repeating Example 4, but not using any isopropyl acid phosphate.

COMPARATIVE EXAMPLE 5

An NBR composition was prepared and tested by repeating Example 4, but changing the amounts of (A) and (B) to 2 and 10 parts by weight, respectively.

COMPARATIVE EXAMPLE 6

An NBR composition was prepared and tested by repeating Example 5, but changing the amounts of (A) and (B) to 15 and 8 parts by weight, respectively.

COMPARATIVE EXAMPLE 7

An NBR composition was prepared and tested by repeating Example 5, but changing the amounts of (A) and (B) to 2 and 1 part by weight, respectively.

The results of the tests are shown in a table below by three symbols:

○—No adherence was found;

Δ—Some adherence;

X—Heavy adherence.

TABLE

| Example | Test I | | Test II | | Test III | | Test IV | | Test V | |
|---|---|---|---|---|---|---|---|---|---|---|
| | In oil | In air | In oil | In air | In oil | In air | In oil | In air | In oil | In air |
| Example 1 | ○ | ○ | ○ | ○ | ○ | ○ | ○ | ○ | ○ | ○ |
| Example 2 | ○ | ○ | ○ | ○ | ○ | ○ | ○ | ○ | ○ | ○ |
| Example 3 | ○ | ○ | ○ | ○ | ○ | ○ | ○ | ○ | ○ | ○ |
| Comparative Example 1 | X | Δ | Δ | Δ | X | Δ | X | Δ | X | Δ |
| Comparative Example 2 | X | X | X | Δ | X | X | X | X | X | X |
| Comparative Example 3 | X | X | X | X | X | X | X | X | X | X |
| Example 4 | ○ | ○ | ○ | ○ | ○ | ○ | ○ | ○ | ○ | ○ |
| Example 5 | ○ | ○ | ○ | ○ | ○ | ○ | ○ | ○ | ○ | ○ |
| Example 6 | ○ | ○ | ○ | ○ | ○ | ○ | ○ | ○ | ○ | ○ |
| Comparative Example 4 | X | Δ | X | Δ | X | X | X | X | X | X |
| Comparative Example 5 | X | X | X | Δ | X | X | X | X | X | X |
| Comparative Example 6 | Δ | ○ | Δ | ○ | Δ | ○ | X | Δ | X | Δ |
| Comparative Example 7 | X | Δ | X | Δ | X | Δ | X | X | X | X |

The following is a summary of the results: (1) No adherence was found by the tests conducted on any product embodying this invention either in oil or in the air; and (2) At least some adherence was found by the tests conducted on the products of the Comparative Examples. The product of Comparative Example 6 showed a better result in its adherence tests than the other Comparative Examples, but had heavily contaminated the mold used for its preparation, presenting a serious problem in productivity.

What is claimed is:

1. A method for preparing a rubber seal product comprising the steps of:

(1) preparing a rubber composition comprising acrylonitrile-butadiene rubber (NBR), including
(A) a carbocyclic phosphite compound represented by the general formula

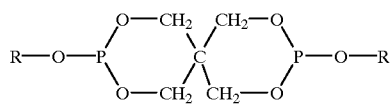

where R is an alkyl group having 8 to 24 carbon atoms, or a phenyl group having a mono-, di- or tri-substituted alkyl group having 1 to 10 carbon atoms, and
(B) an acid phosphate compound represented by the general formula

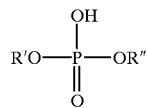

where R' is a hydrogen atom, or an alkyl group having 1 to 13 carbon atoms, and R" is an alkyl group having 1 to 13 carbon atoms, said phosphate compound having an acid number of about 150 to 800 KOH mg/g;

wherein a total of about 5 to 20 parts by weight of compound (A) and compound (B) are present in the composition based on 100 parts by weight of NBR, (2) vulcanizing said rubber composition to obtain a vulcanized rubber composition; and (3) compressing the vulcanized rubber composition toward a metal surface to form said sealed product.

2. The method according to claim 1, wherein said total of the (A) and (B) compounds consists of about 20 to 90% by weight of (A) and about 10 to 80% by weight of (B).

3. The method according to claim 1, wherein said acid value is of about 200 to 700 KOH mg/g.

4. The method for using a sealing member according to claim 2, wherein said total consists of about 40 to 80% by weight of (A) and about 20 to 60% by weight of (B).

5. The method according to claim 1, wherein the rubber composition further comprises NBR with chloride units.

6. The method according to claim 1, wherein the NBR contains carboxyl groups.

7. The product made by the method of claim 1.

8. The product made by the method of claim 2.

9. The product made by the method of claim 4.

* * * * *